United States Patent [19]

Dornbusch et al.

[11] Patent Number: 5,692,577
[45] Date of Patent: Dec. 2, 1997

[54] CONVERSION ASSEMBLY FOR A MOTORCYCLE

[75] Inventors: Larry Dornbusch, Glen Ellyn; Leon Thill, Bensenville; James Ford, Arlington Heights, all of Ill.

[73] Assignee: D.F.T., Inc., Glen Ellyn, Ill.

[21] Appl. No.: 532,431

[22] Filed: Sep. 22, 1995

[51] Int. Cl.$^6$ .................................................. B62K 13/04
[52] U.S. Cl. .......................... 180/16; 180/209; 180/210; 280/112.2
[58] Field of Search .............................. 180/21, 208, 209, 180/210, 215, 359, 16; 280/282, 62, 112.2

[56] References Cited

U.S. PATENT DOCUMENTS

| | | | |
|---|---|---|---|
| 4,287,960 | 9/1981 | McConnell | 180/217 X |
| 4,449,602 | 5/1984 | Dittmann, Jr. | 180/215 |
| 4,478,305 | 10/1984 | Martin, II | 180/215 |
| 4,561,518 | 12/1985 | Grinde | 180/217 X |
| 4,659,106 | 4/1987 | Fujita et al. | 280/112.2 X |
| 4,887,829 | 12/1989 | Prince | 280/112.2 X |
| 5,499,689 | 3/1996 | Johnson | 180/209 X |

FOREIGN PATENT DOCUMENTS

| | | | |
|---|---|---|---|
| 2616-405-A | 12/1988 | France | 180/215 |
| 63-38032 | 2/1988 | Japan | 180/210 |

*Primary Examiner*—Victor E. Johnson
*Attorney, Agent, or Firm*—Marshall, O'Toole, Gerstein, Murray & Borun

[57] ABSTRACT

An assembly for converting a two-wheeled motorcycle into a three-wheeled motorcycle which provides independent suspension for each of the rear wheels and which has a relatively low unsprung weight, thus not substantially impairing the performance of the motorcycle after it is converted to a three-wheeled vehicle. The assembly may be bolted to the frame of a motorcycle, without the need for welds or other permanent connections, so that the three-wheeled motorcycle can be converted back into a two-wheeled motorcycle when desired.

16 Claims, 4 Drawing Sheets

5,692,577

1

CONVERSION ASSEMBLY FOR A MOTORCYCLE

BACKGROUND OF THE INVENTION

The present invention is directed to an assembly for converting a two-wheeled motorcycle into a three-wheeled motorcycle.

Conventional assemblies have been used to convert two-wheeled motorcycles into three-wheeled motorcycles. Such assemblies may utilize the rear end of an automobile, for example a Ford Pinto, having a single, relatively heavy axle which is connected to a motorcycle frame to convert the motorcycle into a three-wheeled vehicle. One disadvantage of such a construction is that the suspension of the vehicle is adversely affected by its single axle, which significantly increases the unsprung weight of the vehicle and unduly limits its performance.

SUMMARY OF THE INVENTION

The invention is directed to an assembly for converting a two-wheeled motorcycle into a three-wheeled motorcycle which provides independent suspension for each of the rear wheels and which has a relatively low unsprung weight, thus not substantially impairing the performance of the motorcycle after it is converted to a three-wheeled vehicle. The assembly may be bolted to the frame of a motorcycle, without the need for welds or other permanent connections, so that the three-wheeled vehicle can be converted back into a two-wheeled motorcycle when desired.

An assembly in accordance with the invention includes a mounting frame and a plurality of couplers attached to the mounting frame, each of the couplers being adapted to be connected to a respective portion of a motorcycle frame so as to maintain the mounting frame in a fixed position with respect to the motorcycle frame. A pair of pivot arms are pivotally connected to the mounting frame, a first pivot arm being adapted to be connected to a portion of a first wheel assembly and a second pivot arm being adapted to be connected to a portion of a second wheel assembly. A plurality of shock absorbers are connected to the mounting frame and the pivot arms so that the wheel assemblies are movable with respect to each other, and drive means for imparting motive power to the wheel assemblies are connected between the mounting frame and the wheel assemblies.

The mounting frame may have a first frame portion and a second frame portion, the second frame portion having a position which is adjustable relative to the first frame portion. The first frame portion may have a pair of slotted portions and the second frame portion may have a pair of vertically disposed plates which are slidably adjustable within the slotted portions of the first frame portion.

The conversion assembly may also be as a suspension assembly in new three-wheeled motorcycles.

These and other features and advantages of the present invention will be apparent to those of ordinary skill in the art in view of the detailed description of the preferred embodiment, which is made with reference to the drawings, a brief description of which is provided below.

2

Figure 1:
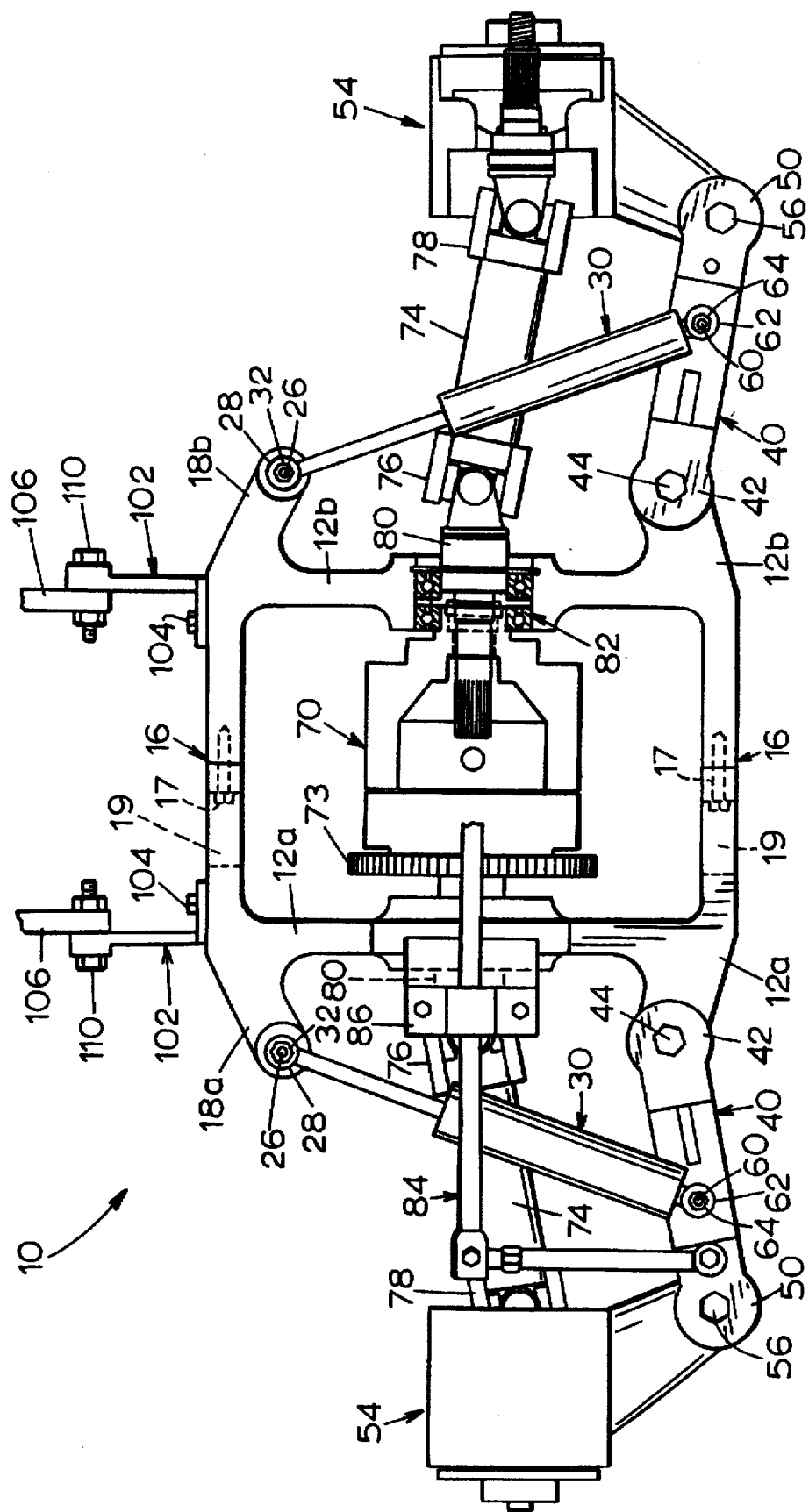
FIG. 1 is a an elevational view of a preferred embodiment of a motorcycle conversion assembly in accordance with the invention shown from the rear of a motorcycle.
Figure 3:
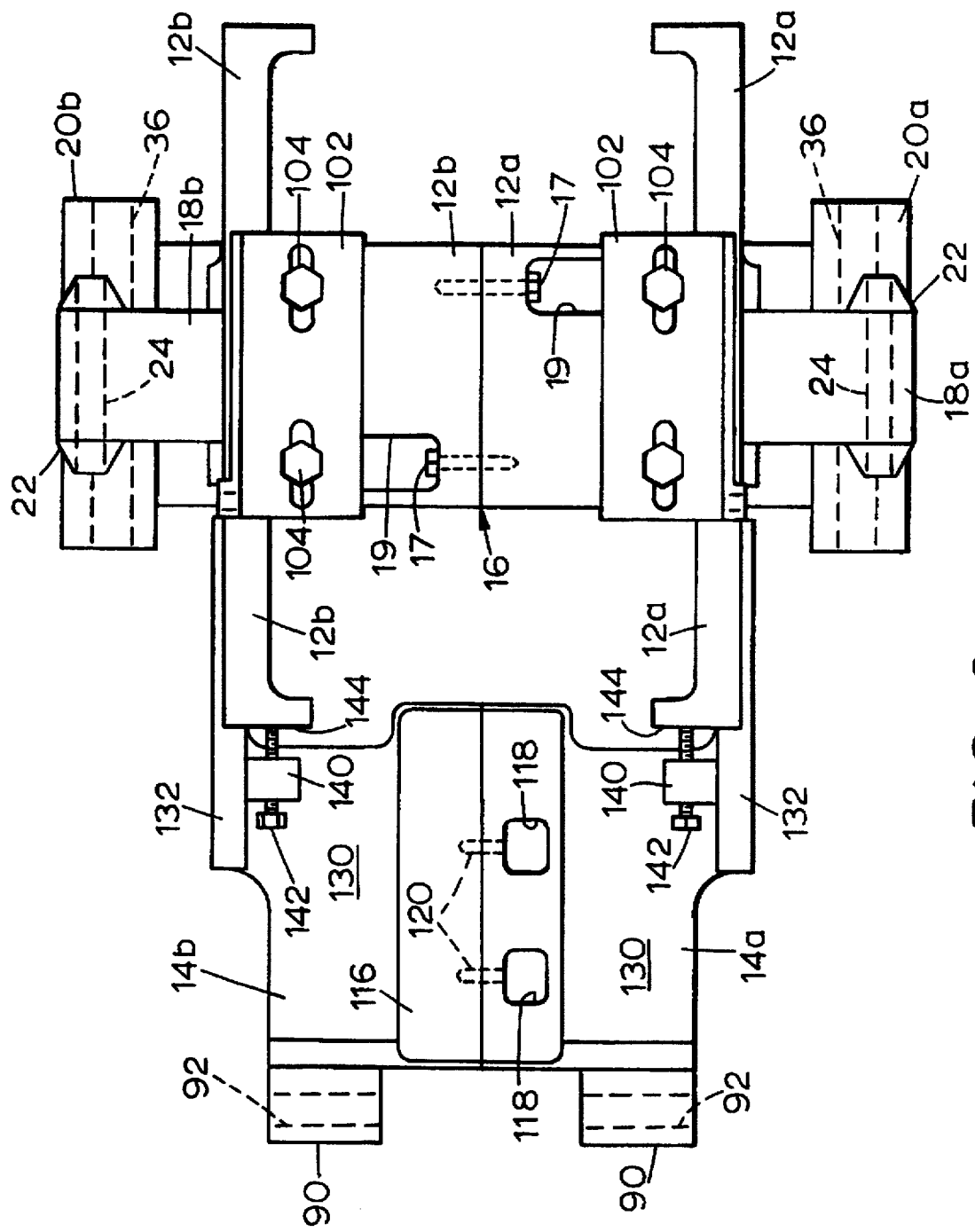
Figure 4:
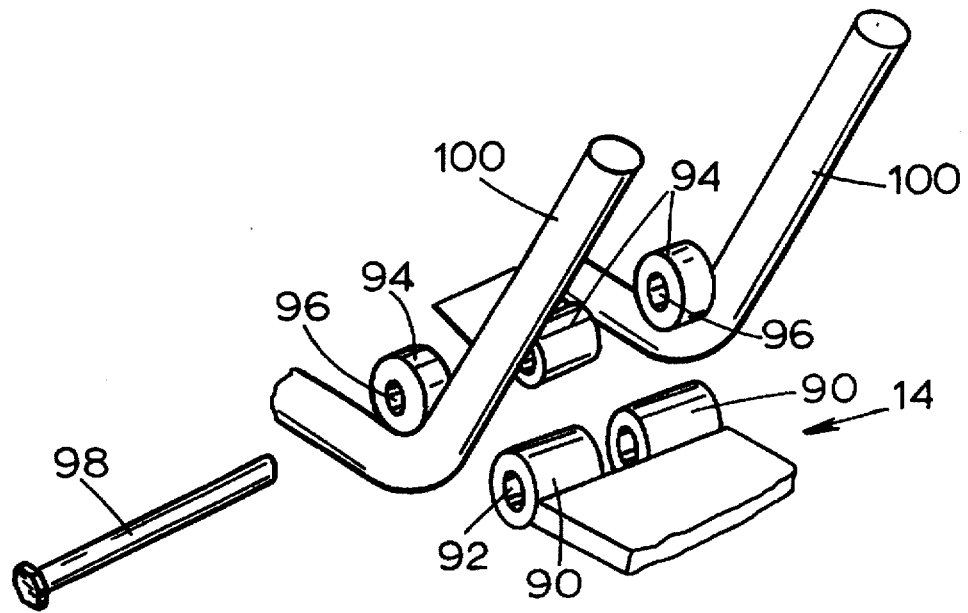
Figure 5:
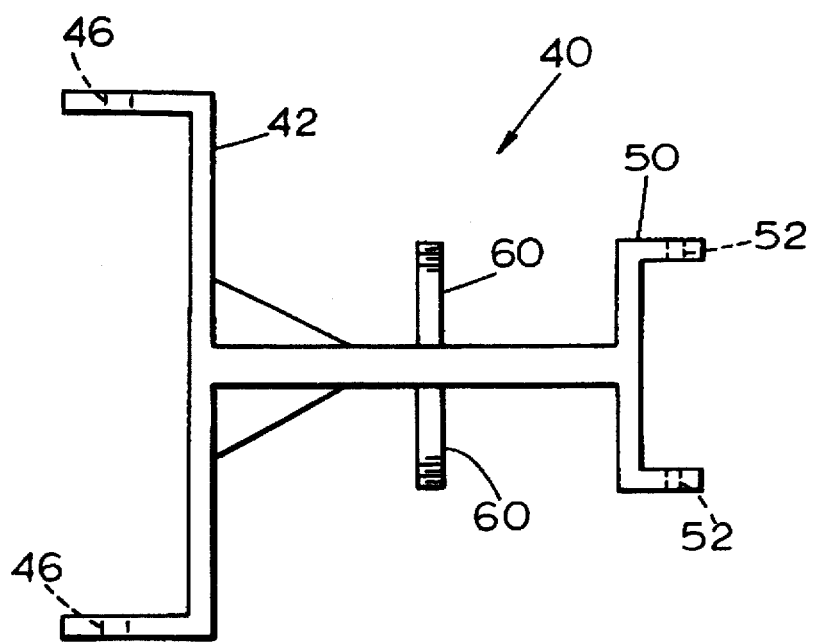

FIG. 3 is a top view of the motorcycle conversion assembly of FIG. 1;

FIG. 4 is a perspective view illustrating how a portion of the conversion assembly attaches to a motorcycle; and FIG. 5 is a top view of the pivot arm shown in FIG. 1.

DETAILED DESCRIPTION OF A PREFERRED EMBODIMENT

Figure 2:
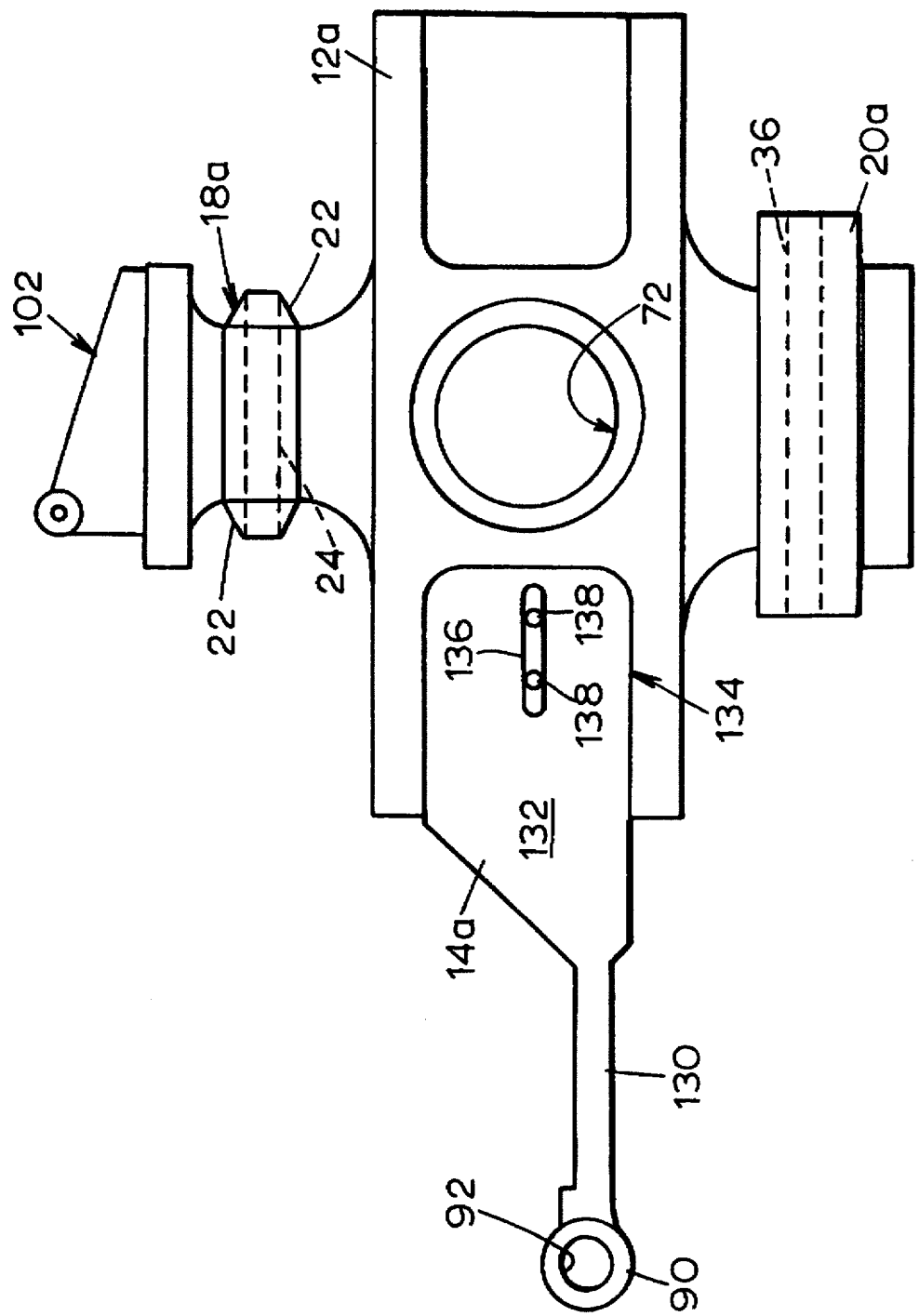
FIG. 2 is a side view of the motorcycle conversion assembly of FIG. 1.

A preferred embodiment of an assembly 10 for converting a two-wheeled motorcycle into a three-wheeled motorcycle is illustrated in FIGS. 1–3. Referring to FIGS. 1–3, the assembly 10 includes a mounting frame having a left frame portion 12a, a right frame portion 12b, and a pair of front frame portions 14a, 14b (shown in FIGS. 2 and 3), which are adjustably connected to the frame portions 12a, 12b. As shown in FIG. 1, the frame portions 12a, 12b meet at a pair of joints 16, and may be secured together via a number of horizontally disposed bolts 17 which are disposed in a number of generally cylindrical openings 19 (see FIG. 3) and which pass through both frame portions 12a, 12b (some of the bolts 17 and openings 19 are omitted from FIG. 1 for purposes of clarity). The frame portions 12a, 12b, 14a, 14b may be composed of machined aluminum, for example. The particular manner in which the frame portions 12a, 12b are fastened together is not considered important to the invention, and other connection means may be used.

A pair of shock absorber mounts 18a, 18b and a pair of pivot arm mounts 20a, 20b are integrally formed with the frame portions 12a, 12b. Each of the shock mounts 18a, 18b has a pair of flanged ends 22 and a central bore 24 formed therein to facilitate the insertion of a rod 26 (see FIG. 1) having two threaded ends to each of which a top attachment ring 28 of a shock absorber 30 can be attached via a number of bolts 32, two shock absorbers 30 being mounted to each shock mount 18a, 18b for a total of four shock absorbers 30 (the springs of the shock absorbers 30 are not shown). Each of the pivot arm mounts 20a, 20b has a central bore 36 (see FIG. 3) formed therein. Any type of shock absorption mechanism or spring coil could be used as shock absorbers.

A pivot arm 40 is connected to each of the pivot arm mounts 20a, 20b. Referring to FIGS. 1 and 5, each pivot arm 40 has a first C-shaped end 42 which pivotably mounts to one of the pivot arm mounts 20a, 20b via a bolt 44 (see FIG. 1) which passes through a pair of holes 46 formed in the end 42 and the central bore 36 (FIG. 3) formed in one of the pivot arm mounts 20a, 20b. Each pivot arm 40 has a second C-shaped end 50 having a pair of holes 52 (FIG. 5) formed therein which mounts to one of a pair of wheel assemblies 54 (FIG. 1), to which a pair of rear wheels (not shown) may be attached, via a bolt 56 which passes through the holes 52 (FIG. 5) formed in the end 50 and a central bore (not shown) formed in one of the wheel assemblies 54. Each pivot arm 40, which may be composed of steel, has a pair of rods 60 (FIG. 5) connected thereto, the end portions of which are threaded. As shown in FIG. 1, a bottom ring portion 62 of each of the shock absorbers 30 is attached to one of the rods 60 via a bolt 64.

The assembly 10 includes a differential gearbox 70 mounted to the frame portions 12a, 12b via a pair of holes 72 formed therein. A drive sprocket 73 is connected to drive the differential 70 from power transmitted by the chain of the motorcycle (not shown). Motive power is transmitted from the differential 70 to each of the wheel assemblies 54 via a drive shaft 74 connected between a pair of universal joints 76, 78. A pair of drive axles 80 mounted to the frame portions 12a, 12b via a pair of bearing assemblies 82 interconnect each of the universal joints 76 to the differential 70. The assembly 10 includes a swaybar 84 connected to the frame portions 12a, 12b via a pair of mounting brackets 86 (only one of which is shown). The particular design of the drive train is not considered important to the invention, and the drive train could be modified to accommodate motorcycles which are driven via direct-drive shafts instead of chains.

Referring to FIGS. 2–4, each of the front frame portions 14a, 14b of the assembly 10 has a pair of cylindrical mounting tubes 90 with a pair of bores 92 formed therein. As shown in FIG. 4, the front frame portions 14a, 14b mount to a number of cylindrical tubes 94 having central bores 96 via a swing arm rod 98, the tubes 94 being rigidly connected, such as by welding, to a motorcycle frame 100.

Referring to FIGS. 1 and 3, a pair of L-shaped clamps 102 are connected to the top of the frame portions 12a, 12b. The horizontal portions of the clamps 102 are bolted to the frame portions 12a, 12b via a number of bolts 104, and the vertical portion of each clamp 102 is bolted to another portion 106 of the motorcycle frame (FIG. 1) via a bolt 110. Because the assembly 10 is connected to the motorcycle frame at the points described above, the frame portions 12a, 12b, 14a, 14b are rigidly coupled to the motorcycle frame.

Referring to FIG. 3, the front frame portions 14a, 14b may have a rectangular groove 116 formed therein to accommodate a motorcycle battery (not shown), and a pair of rectangular holes 118 may be formed therethrough to facilitate the fastening of bolts (not shown) into a pair of threaded holes 120 in order to bolt the front frame portions 14a, 14b together.

Referring to FIG. 2, each of the front frame portions 14a, 14b comprises a horizontally disposed plate 130 and a vertically disposed plate 132 integrally formed therewith. Each plate 132 is slidably adjustable within a generally rectangular slotted portion 134 formed in the outer surface of each of the frame portions 12a, 12b. A relatively narrow slot 136 is formed in each of the vertical plates 132 at the same height as a plurality of threaded holes 138 formed in the frame portions 12a, 12b. The vertical plates 132 are fixed to the frame portions 12a, 12b via a number of bolts (not shown) which pass through the slot 136 and the threaded holes 138.

A pair of adjustment blocks 140 are mounted at the intersection of the vertical and horizontal plates 130, 132 of the front frame portions 14a, 14b. Each adjustment block 140 is threaded to receive a respective threaded adjustment bolt 142, each of which has an end which may abut a respective front face 144 of the frame portions 12a, 12b.

To convert a two-wheeled motorcycle to a three-wheeled vehicle using the assembly 10, with the motorcycle supported in an elevated position, the rear wheel, fender, shocks and swing arm of the motorcycle are removed. Then, the motorcycle drive sprocket 73 is attached to the differential 70; the motorcycle chain (not shown) is placed on the drive sprocket 73; and the frame portions 12a, 12b are bolted together at the joints 116.

The front frame portions 14a, 14b are bolted together and attached to the motorcycle via the swing arm bolt 98. The position of the frame portions 14a, 14b with respect to the frame portions 12a, 12b is adjusted by turning the adjustment bolts 142 until the motorcycle chain is properly tensioned. Then the frame portions 14a, 14b are rigidly fastened to the frame portions 12a, 12b via bolts (not shown) which pass through the slots 136 in the frame portions 14a, 14b and the threaded holes 138 in the frame portions 12a, 12b. The L-shaped clamps 102 are then fastened to the motorcycle frame portions 106 via the bolts 110.

When mounted to a motorcycle, the assembly 10 is advantageous in that it provides independent suspension of the rear wheels (i.e. one rear wheel assembly is movable relative to the other rear wheel assembly), and in that the unsprung weight of the vehicle is reduced in comparison with conventional assemblies. As used herein, the term "unsprung weight" means the weight of the vehicle components which are not cushioned against vibration by the shock absorbers 30. Thus, the frame components 12a, 12b, 14a, 14b and the differential 70 would not contribute to the unsprung weight of the vehicle. Also, since it is bolted to the motorcycle frame, the assembly 10 can be removed after it is installed so that the vehicle can be converted back into a two-wheeled motorcycle.

The design of the assembly described above may be modified so that it may be retrofitted to any commercially available motorcycle. Further modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An assembly for converting a two-wheeled motorcycle to a three-wheeled motorcycle, said assembly comprising:

a mounting frame having a first frame portion and a second frame portion, said second frame portion having a position which is adjustable relative to said first frame portion;

a plurality of couplers attached to said mounting frame, each of said couplers being adapted to be connected to a respective portion of a motorcycle frame so as to maintain said mounting frame in a fixed position with respect to said motorcycle frame;

a pair of pivot arms pivotally connected to said mounting frame, a first of said pivot arms being connected to a portion of a first motorcycle wheel assembly and a second of said pivot arms being connected to a portion of a second motorcycle wheel assembly;

a plurality of shock absorbers;

means for mounting said shock absorbers to said mounting frame and said pivot arms so that said first and second motorcycle wheel assemblies are movable with respect to each other; and drive means supported by said mounting frame and coupled to said first and second motorcycle wheel assemblies and adapted to impart motive power to said first and second motorcycle wheel assemblies, said drive means including a differential, a first drive shaft coupled between a first side of said differential and said first motorcycle wheel assembly, and a second drive shaft coupled between a second side of said differential and said second motorcycle wheel assembly.

2. An assembly as defined in claim 1 wherein said first frame portion comprises a pair of slotted portions and wherein said second frame portion comprises a pair of vertically disposed plates which are slidably adjustable within said slotted portions of said first frame portion.

3. An assembly as defined in claim 2 wherein one of said couplers comprises a cylindrical tube adapted to receive a swing arm bolt of a motorcycle.

4. An assembly as defined in claim 2,
- wherein said mounting means comprises a first shock mount adapted to support a first end of each of a first pair of shock absorbers and a second shock mount adapted to support a first end of each of a second pair of shock absorbers;
- wherein said first pivot arm comprises first pivot arm mounting means for mounting a second end of each of said first pair of shock absorbers and wherein said second pivot arm comprises second pivot arm mounting means for mounting a second end of each of said second pair of shock absorbers; and
- wherein said first pair of shock absorbers are mounted between said first shock mount and said first pivot arm mounting means and wherein said second pair of shock absorbers are mounted between said second shock mount and said second pivot arm mounting means.

5. An assembly as defined in claim 1 wherein a first of said couplers comprises a tubular cylinder adapted to receive a motorcycle swing arm bolt.

6. An assembly as defined in claim 1 wherein one of said couplers comprises a mounting member adapted to be bolted to a portion of said motorcycle frame.

7. An assembly for converting a two-wheeled motorcycle to a three-wheeled motorcycle, said assembly comprising:
- a mounting frame;
- a plurality of couplers attached to said mounting frame, each of said couplers being adapted to be connected to a respective portion of a motorcycle frame so as to maintain said mounting frame in a fixed position with respect to said motorcycle frame;
- a pair of pivot arms pivotally connected to said mounting frame, a first of said pivot arms being connected to a portion of a first motorcycle wheel assembly and a second of said pivot arms being connected to a portion of a second motorcycle wheel assembly;
- a plurality of shock absorbers connected to said mounting frame and to said pivot arms so that said first and second motorcycle wheel assemblies are movable with respect to each other; and
- drive means connected to said mounting frame and to at least one of said first and second motorcycle wheel assemblies and adapted to impart motive power to at least one of said first and second motorcycle wheel assemblies.

8. An assembly as defined in claim 7 wherein said mounting frame comprises a first frame portion and a second frame portion, said second frame portion having a position which is adjustable relative to said first frame portion.

9. An assembly as defined in claim 8 wherein said first frame portion comprises a pair of slotted portions and wherein said second frame portion comprises a pair of vertically disposed plates which are slidably adjustable within said slotted portions of said first frame portion.

10. An assembly as defined in claim 8 wherein one of said couplers comprises a cylindrical tube adapted to receive a swing arm bolt of a motorcycle.

11. An assembly as defined in claim 8 wherein said first frame portion comprises means for supporting a differential and a pair of shock mounts for mounting said shock absorbers to said mounting frame.

12. An assembly as defined in claim 11 wherein each of said shock absorbers has a first end connected to one of said shock mounts and a second end connected to one of said pivot arms.

13. An assembly as defined in claim 8,
- wherein said first frame portion comprises means for supporting a differential;
- wherein said first frame portion comprises a first shock mount being adapted to support a first end of each of a first pair of shock absorbers and a second shock mount being adapted to support a first end of each of a second pair of shock absorbers;
- wherein a first of said pivot arms comprises first pivot arm mounting means for mounting a second end of each of said first pair of shock absorbers and wherein a second of said pivot arms comprises second pivot arm mounting means for mounting a second end of each of said second pair of shock absorbers;
- wherein said first pair of shock absorbers are mounted between said first shock mount and said first pivot arm mounting means and wherein said second pair of shock absorbers are mounted between said second shock mount and said second pivot arm mounting means.

14. An assembly as defined in claim 7 wherein said drive means comprises a first drive shaft coupled between a first side of a differential and said first motorcycle wheel assembly and a second drive shaft coupled between a second side of said differential and said second motorcycle wheel assembly.

15. An assembly as defined in claim 7 wherein a first of said couplers comprises a tubular cylinder adapted to receive a motorcycle swing arm bolt.

16. An assembly as defined in claim 7 wherein one of said couplers comprises a mounting member adapted to be bolted to a portion of said motorcycle frame.

\* \* \* \* \*